United States Patent

Harnois

[11] Patent Number: 5,818,542
[45] Date of Patent: Oct. 6, 1998

[54] PROCESSING IMAGE DATA

[75] Inventor: Stéphane Robert Harnois, Chomedey Laval, Canada

[73] Assignee: Discreet Logic, Inc.

[21] Appl. No.: 632,341

[22] Filed: Apr. 10, 1996

[51] Int. Cl.[6] ................................................. H04N 5/265
[52] U.S. Cl. ........................ 348/594; 348/595; 348/720
[58] Field of Search ...................................... 348/578, 584, 348/594, 595, 598, 552, 716, 718, 720; H04N 5/262, 5/265

[56] References Cited

U.S. PATENT DOCUMENTS

| | | | |
|---|---|---|---|
| 4,524,421 | 6/1985 | Searby et al. | 348/577 |
| 4,538,188 | 8/1985 | Barker et al. | 386/54 |
| 4,558,302 | 12/1985 | Welch | 341/51 |
| 4,602,286 | 7/1986 | Kellar et al. | 348/597 |
| 4,823,108 | 4/1989 | Pope | 345/190 |
| 5,077,610 | 12/1991 | Searby et al. | 348/593 |
| 5,212,544 | 5/1993 | Kellar et al. | 348/590 |
| 5,216,755 | 6/1993 | Walker et al. | 395/132 |
| 5,289,566 | 2/1994 | Walker et al. | 395/132 |
| 5,359,430 | 10/1994 | Zhang | 358/455 |
| 5,384,667 | 1/1995 | Beckwith | 386/55 |
| 5,398,120 | 3/1995 | Friedman et al. | 358/501 |
| 5,430,878 | 7/1995 | Straub et al. | 395/712 |
| 5,442,751 | 8/1995 | Patrick et al. | 395/523 |
| 5,455,600 | 10/1995 | Friedman et al. | 345/153 |
| 5,459,529 | 10/1995 | Searby et al. | 348/586 |
| 5,508,940 | 4/1996 | Rossmere | 395/328 |
| 5,535,137 | 7/1996 | Rossmere | 348/578 |
| 5,592,609 | 1/1997 | Suzuki | 395/173 |

FOREIGN PATENT DOCUMENTS 2066989  10/1992  Canada .
0 360 599 A2  of 0000  European Pat. Off. .

*Primary Examiner*—Howard Britton
*Attorney, Agent, or Firm*—Merek & Voorhees

[57] ABSTRACT

Image data is processed in the form of digitized frames on a video clip. A first clip is received in combination with a second clip. Frames are alternately supplied from each of said clips to a real time rendering device configured to produce a viewable composited clip at video rate. By making use of a rendering engine primarily designed for rendering synthesized images, it is possible to view many video effects, such as dissolves and wipes, in real time.

20 Claims, 5 Drawing Sheets

PROCESSING IMAGE DATA

The present invention relates to processing image data, in which digitised frames of a video clip are receivable at video rate.

INTRODUCTION

The processing of a plurality of image clips to produce a new output clip is generally referred to, within post production environments, as compositing. Compositing stations produced by the present Assignee are distributed under the trademarks "FLAME" and "FLINT", allowing conventional editing techniques and special effects to be introduced as post production procedures in the generation of cinematographic films, broadcast video and promotional videos.

Many compositing stations require sophisticated and high-powered processing systems, often including specific hardware for image processing, including highly parallelized processing systems, often referred to "rendering engines". These engines are primarily configured to receive polygonal data, as part of an image synthesizing process, whereafter pixel data is generated for each viewable polygon as part of a rendering process. By being primarily configured for pixel related processing, such systems are designed to perform many functions in parallel thereby allowing image frames to be generated at a rate compatible with the rate of which such frames would be displayed as part of a video or film clip. This rate is often referred to as "real time" and will be referred to herein as "video rate".

The compositing of images is a highly creative process and often several attempts will be required in order to obtain a desirable result. Often, relatively straightforward processes, such as wipes and dissolves etc, will require substantial degrees of processing, given that calculations are required on a pixel-by-pixel basis and on a frame-by-frame basis. In known systems, calculations are performed serially, such that the generation of composited frames occurs as an off-line process, taking several seconds for each individual frame to be composited. Under these circumstances, it is necessary for an artist or editor to wait for the new frames to be calculated before the resulting composite may be viewed. This reduces the number of attempts that such an artist may take and ultimately degrades the overall functionality of a system.

SUMMARY OF THE INVENTION

According to a first aspect of the present invention, there is provided a method of processing image data, wherein digitized frames of a video clip are receivable at video rate, comprising steps of receiving a first clip of video frames;

receiving a second clip of video frames; and supplying frames alternately from each clip to a real time rendering device so as to produce a viewable composited clip at video rate.

In a preferred embodiment, frames are supplied alternately by writing to memory in a sequential order and then reading from memory in an alternating order.

DETAILED DESCRIPTION OF THE PREFERRED EMBODIMENTS

The invention will now be described by way of example only with reference to the previously identified drawings.

Figure 1:
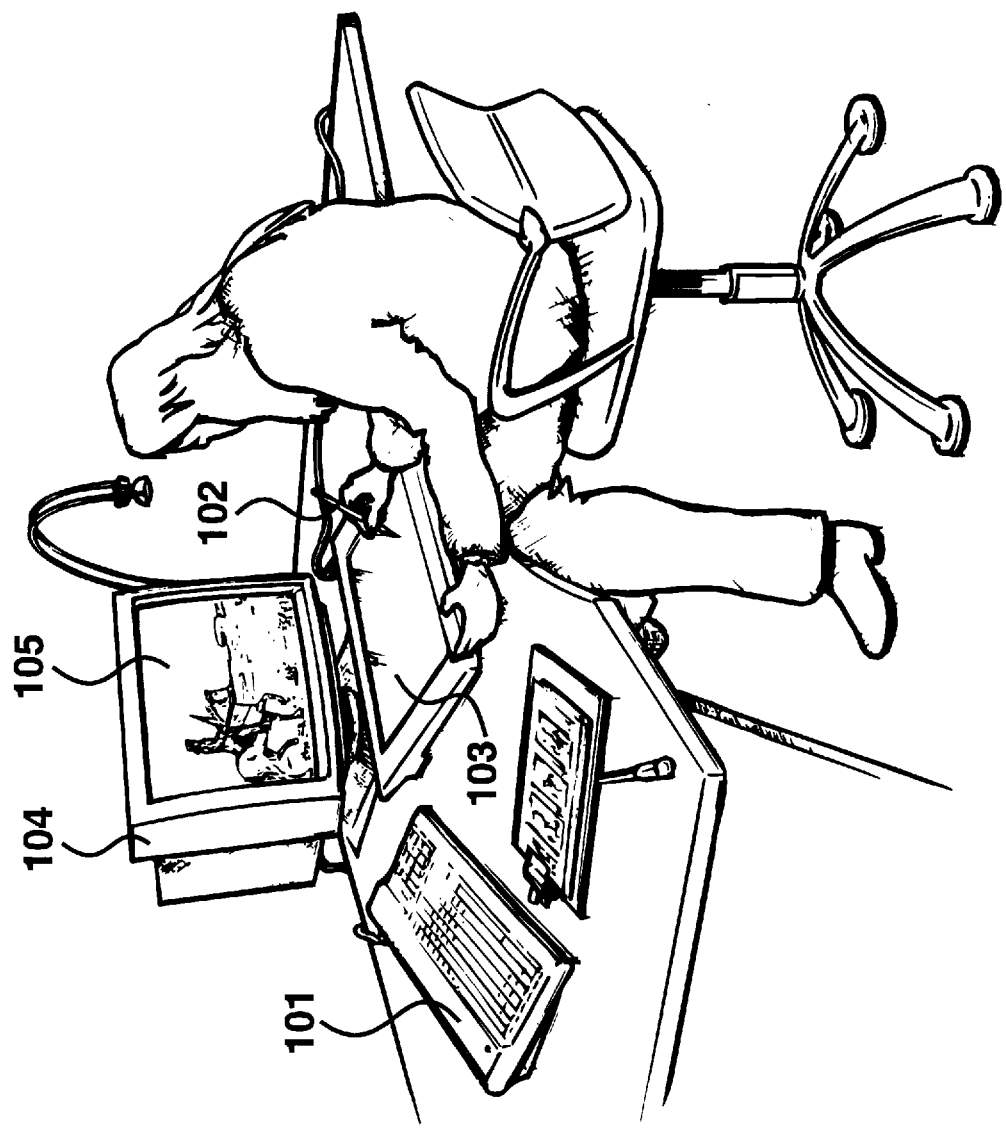
FIG. 1 shows a compositing station, arranged to display image clips and to respond to an artist's manipulations.

A compositing station is illustrated in FIG. 1, in which a video artist selects image clips and a processor processes said clips in response to manual operation of a keyboard 101 and manual operation of a stylus 102 upon a touch tablet 103. Image data is supplied to a monitor 104 and a typical image 105 is shown displayed on said monitor.

Figure 2:
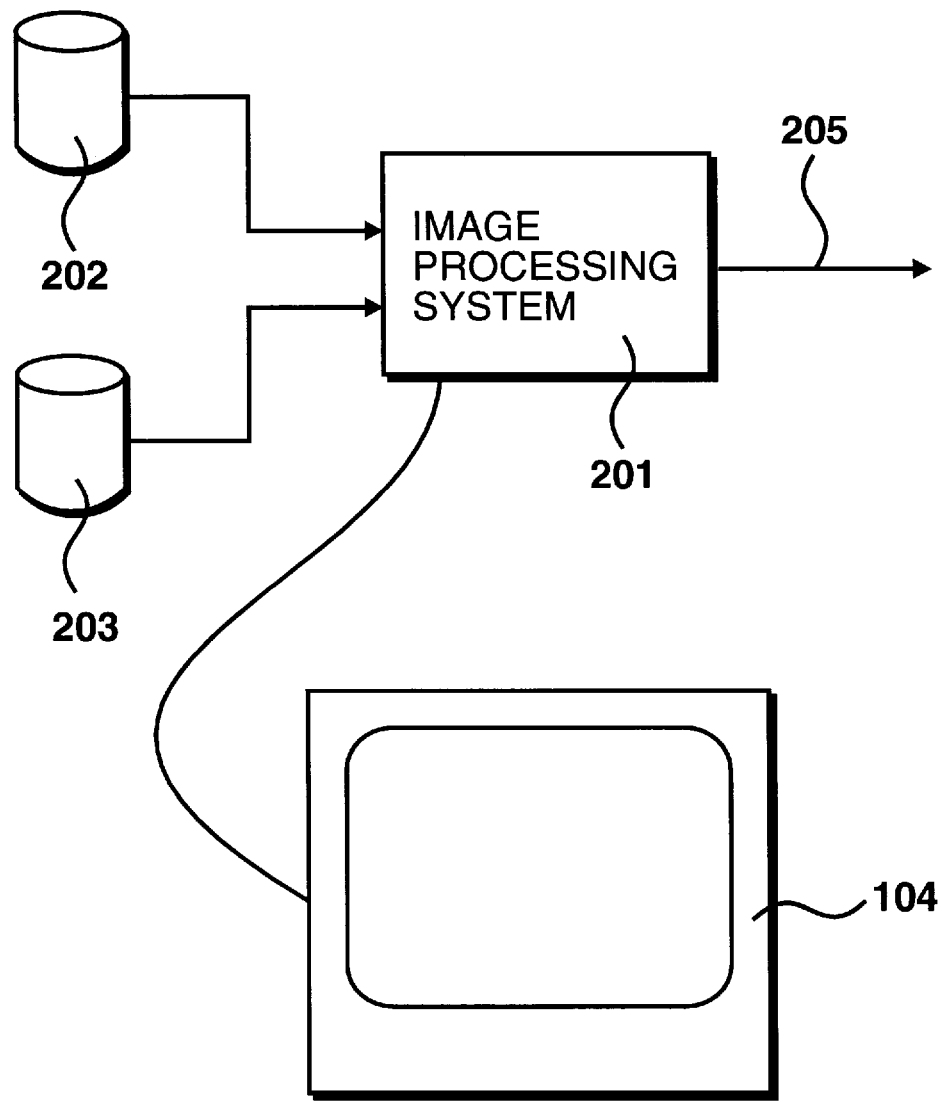
FIG. 2 shows a processing device for supplying video clips to the display device shown in FIG. 2.
Figure 3:
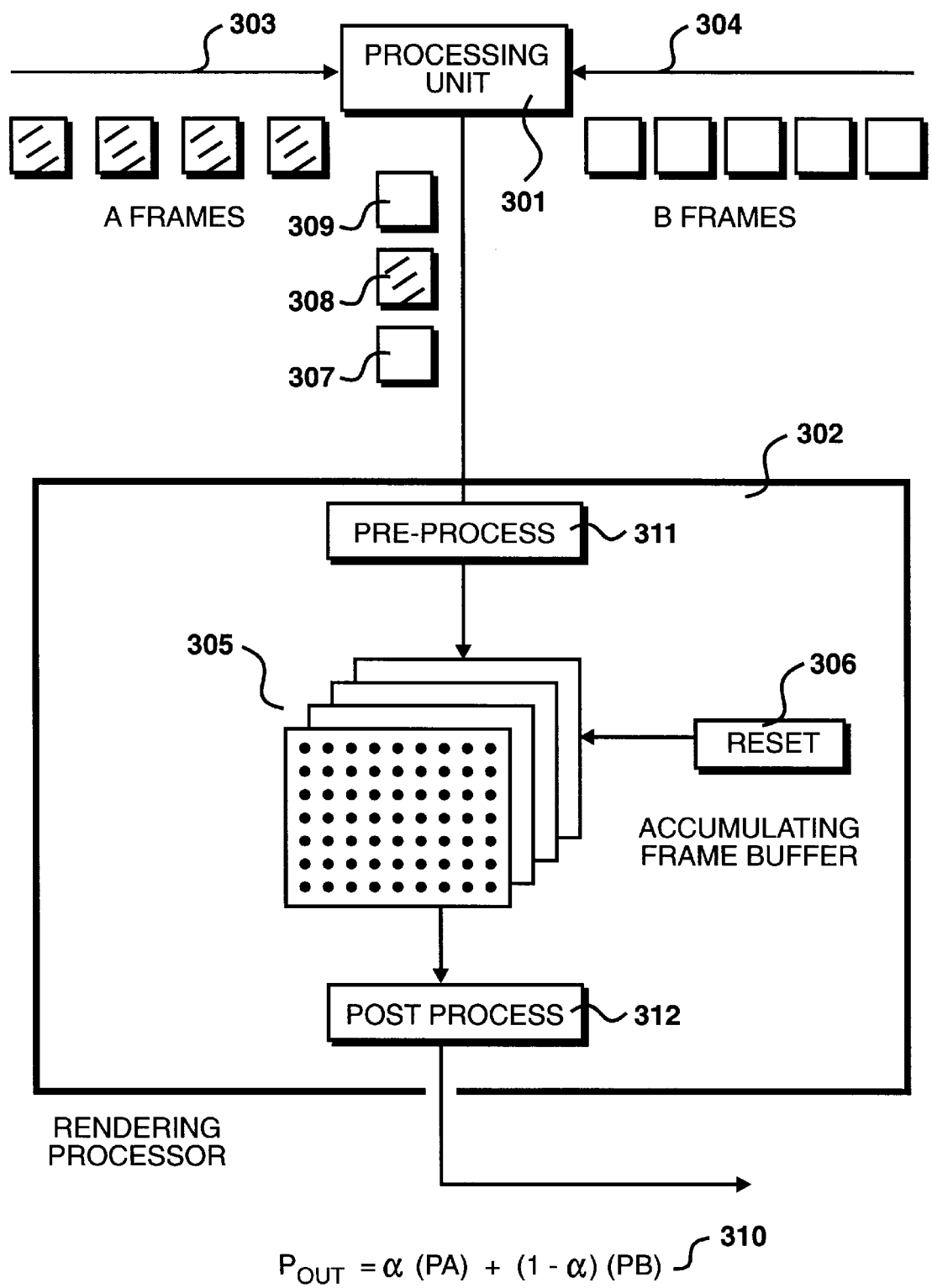
FIG. 3 details the display device shown in FIG. 2, including a processing device and a rendering processor.

Monitor 104 is shown in FIG. 2, arranged to receive image signals from an image processing system 201. The image processing system 201 is arranged to receive two real time video streams, at a transfer rate exceeding video rate, form respective disk arrays 202 and 203. The disk arrays provide digitized video streams at video rate from a redundant array of disks, via a plurality of SCSI interfaces. Disc arrays 202 and 203 may be of the type manufactured by Stone & Wire of Cambridge, Mass., USA and distributed under the trademark "STONE". In addition to providing a viewable output to monitor 104, processing system 102 also provides a composite output on an output line 205 which may be written to tape or returned to storage devices, such as devices 202 and 203. The image processing system 201 is based substantially around a machine manufactured and distributed by Silicon Graphics Inc under the trademark "ONYX". The Onyx processing system includes a plurality of processing units and devices, including a processing unit 301 and a rendering processor 302, as illustrated in FIG. 3. The processing unit 301 is arranged to receive a first stream of input frames from disk 202 over an interface 303. In addition, a second stream of video frames is received from disk 203 over interface 304. Frames supplied over interface 303 may be considered as being derived from clip A with frames supplied over interface 304 being derived from clip B.

The rendering processor 302 is configured to produce composite frames, each derived from an A frame processed in combination with a B frame. The rendering processor 302 includes an accumulating frame buffer 305 configured such that pixel values may be accumulated at respective pixel locations so as to achieve a level of processing on a pixel-by-pixel basis. Thus, pixels derived from a plurality of frames are supplied to the accumulating frame store 305 to produce a single output frame, whereafter the accumulating buffer is re-set in response to a re-set operation generated by a re-setting device 306.

The processing unit 301 supplies frames to the rendering processor 302 in a form which allows said rendering processor to perform operations by making use of its accumulating abilities. Frames are therefore supplied to the rendering processor 302 by alternating source frames from the A clip with frames from the B clip. Thus, as shown in FIG. 3, an nth frame 307 supplied to the rendering processor 302 is derived from the B clip, with an n+l frame 308 being derived from the A clip and an n+z frame 309 again being derived from the B clip, and so on, for the duration of the effect required.

The processing procedure required in order to effect a dissolve is illustrated at 310. For each pixel position of each frame, a pixel value derived from the A clip is identified as PA and a similarly located pixel from the B clip is identified as PB. The relationship shown at 310 provides a dissolve such that, on a frame-by-frame basis, each pixel will be derived from a decreasing proportion of frame A (assuming this to be the first frame) with an increasing proportion derived from frame B. Thus, the PA pixel is multiplied by a decreasing value alpha with the corresponding PB pixel being multiplied by one minus alpha. The two components are then accumulated in the accumulating frame buffer 305, whereafter said buffer is read at video rate in order to produce a displayable video clip, including the specified dissolve, at video rate. In this way, the effect is immediately displayable to the artist via monitor 104 virtually as soon as the dissolved parameters have been identified.

Rendering processor 302 is arranged to effect a preprocess 311 on data being written to the accumulating buffer 305. In addition, the rendering processor 302 is also configured to effect a post-process 312 as data is read from buffer 305. When affecting a wipe, in accordance with relationship 301, pixel multiplication by alpha or by one minus Alpha is performed by pre-process 311. In this example, no further action is required by post-process 312 and the data is read sequentially from frame buffer 305. After reach read operation, the frame buffer is re-set under control of the re-setting mechanism 306, thereby allowing subsequent frames to be accumulated for the generation of the next output frame.

Figure 4:
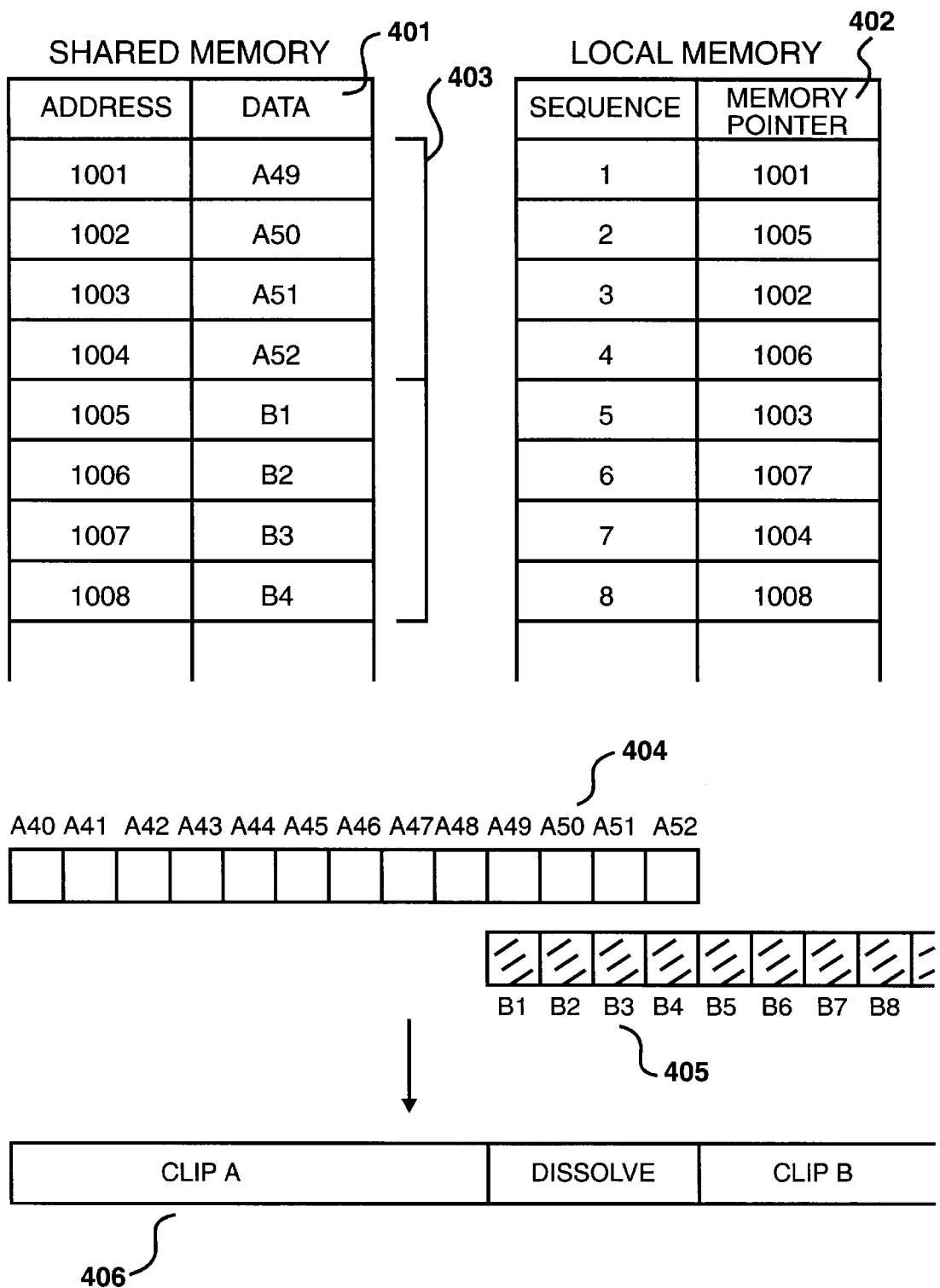
FIG. 4 illustrates operations performed by the processing unit identified in FIG. 3.

Processing unit 301 has access to its own local memory devices in addition to having access to a shared memory area. Part of this shared memory 401 is shown in FIG. 4, alongside part of the local memory 402. Operation of processing unit 301 will be illustrated with reference to a four frame dissolve, although it will be appreciated that dissolves of differing durations may be established or, similarly, variable wipes may be achieved. The disk storage devices operate efficiently if they are allowed to transfer a plurality of frames, in preference to seeking and transmitting individual frames. The system is therefore configured to receive a plurality of frames from the transfer devices which are written to contiguous memory locations within the shared memory area 401 via a direct memory access. In the example, contiguous regions in memory have been identified by addresses 4001, 4002, 4003 etc. A direct memory access is made to addresses 1001 to 1004, identified by bracket 403, resulting in frames A49, A50, A51 and A52 being written to these locations as part of a single disk transfer operation. Thereafter, frames B1, B2, B3, B4 etc are written to memory locations 1005, 1006, 1007 and 1008 etc, respectively.

Prior to the dissolve being performed, the video artist will have specified the start and end points for each clip which in turn defines the number of frames that will be present within the dissolve. Processing unit 301 is configured to generate a frame mapping table in its local memory 402.

The only frames that need to be supplied to the rendering processor 302 are those which actually form part of the dissolve, when said dissolve is being viewed at video rate. A four frame dissolve requires a total of eight frames which have been identified as sequence 1, 2, 3, 4, 5, 6, 7 and 8. Against these sequence numbers, the processing unit 301 is arranged to generate memory pointers identifying memory locations within the shared memory 401. As previously described with reference to FIG. 3, frames are supplied to the rendering processor 302 in an alternating sequence. Thus, the frame from clip A is supplied to the rendering processor followed by a frame from clip B. A further frame from clip A is then supplied to the rendering processing but while this is taking place, the rendering processor will have processes the previous two frames in parallel, so as to provide a composited output frame.

This is illustrated by the overlaying of the A clip 404 against the B clip 405. Thus, the output clip will consist initially of frames derived from clip A up to and including frame A48. The dissolve occurs over frames A49, A50, A51 and A52. At frame A49 a proportion of frame B1 is included. Similarly, the next output frame is derived by combining a portion of frame A50 with a portion of frame B1, in accordance with relationship 301. For the next output frame the variable alpha is decreased and a proportion of frame A51 is combined with a proportion of frame B3. A final reduction of the variable alpha is performed for the fourth frame derived by combining pixel values from frame A52 with similar pixel values from frame B4. By frame B6 the dissolve is complete and subsequent output frames are derived exclusively from the B clip. The resulting output frame is illustrated at 406 and consists initially of frames derived from clip A, followed by the dissolve between clip A and clip B, followed by frames being exclusively derived from clip B. Only the dissolve frames required use of the rendering processor 302.

Processing unit 301 is arranged to supply alternating frames to the rendering processor 302 as required in order to produce the dissolve. The rendering processor therefore firstly requires frame A49 so that pixel values may be multiplied by the first variable alpha. This frame is located at address 1001, therefore the first sequenced frame, frame 1, includes a memory pointer to this location, identified as 1001 in the memory pointer column. Subsequently, frame B1 is required by the rendering processor 302, therefore a pointer to memory location 1005 is placed at sequence position 2.

Having received these two frames, it is possible for the rendering processor to produce an output frame, in response to a re-set signal, such that the next output frame may be generated. The second output frame is generated from input frame A50, therefore sequence position 3 includes a memory pointer to location 1002. This frame is processed in combination with frame B2, therefore the fourth sequence position includes a memory pointer to frame 1006. Thus, as shown in FIG. 4, memory pointers are included to memory locations 1003, 1007, 1004 and 1008 for sequenced frames 5, 6, 7 and 8 respectively.

Figure 5:
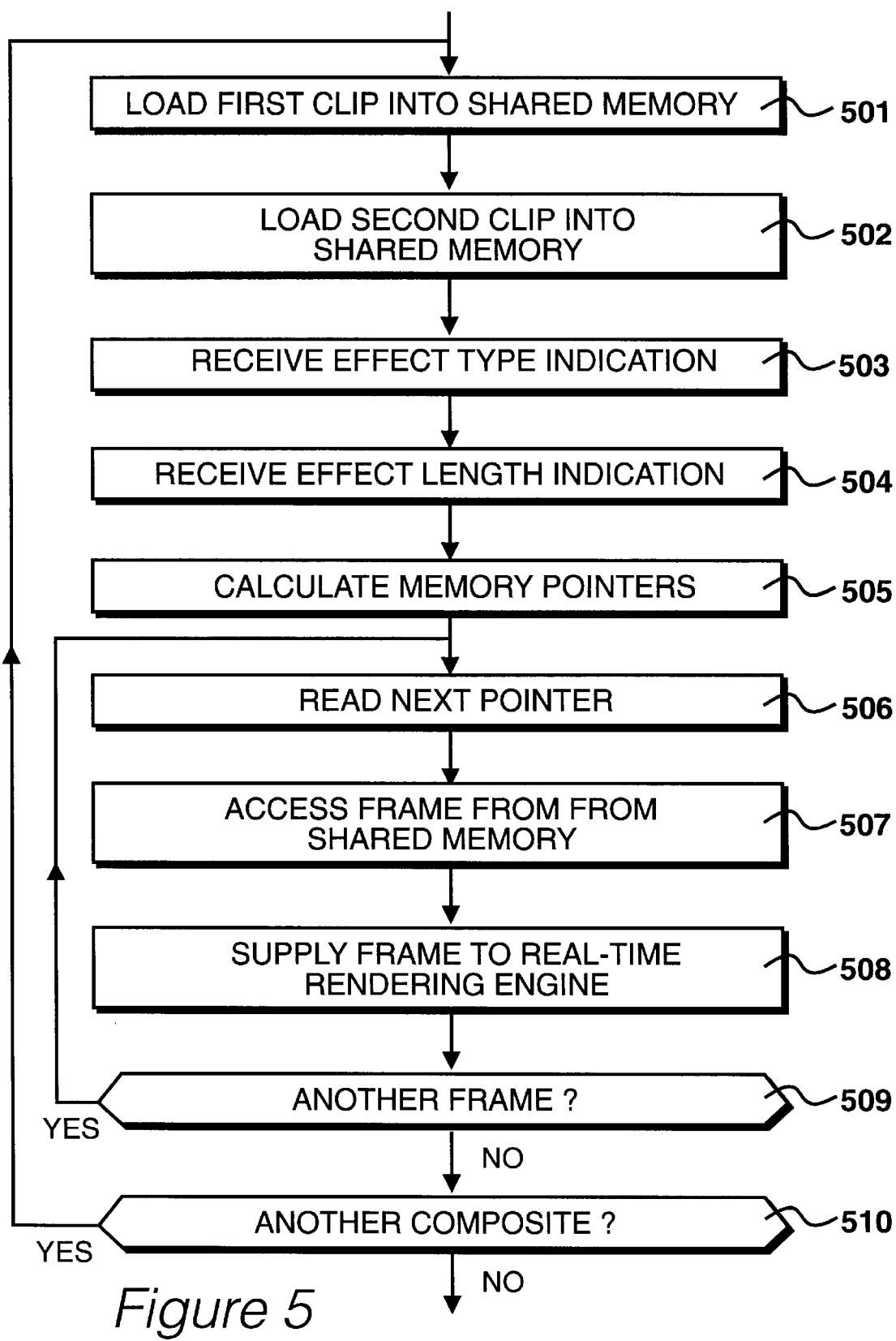
FIG. 5 details operations of the processing unit shown in FIG. 3.

Procedures effected by processing unit 301 are detailed in FIG. 5. At step 501 a first clip or section of a first clip is written to shared memory whereafter at step 502 a second clip is written to said memory.

At step 503 as indication of the effect type is provided, in response to manual operation of stylus 102 and, similarly, at step 504 an indication of the effect length is received, that is to say, as specific frames are identified for which the effect is required.

Having loaded the source material to shared memory, via a direct memory access, the memory pointers are calculated at step 505 and stored in local memory 402. Processing unit 301 is now in a position to supply frames to the rendering processor 302.

At step 506 the next memory pointer is read by addressing the first sequence position in the allocated area of local memory 402. Thus, on the first iteration, this will result in memory pointer 1001 being identified whereafter, at step 507, the particular frame is accesses by accessing memory location 1001 is shared memory 401.

At step 508 frame A49, read from memory location 1001, is supplied to the rendering engine whereafter at step 509 a question is asked as to whether another frame is present.

On the first iteration, the question asked at sept 509 will be answered in the affirmative, resulting in control being returned to step 506. A sequence count will have been incremented, resulting in memory position number 2 being accessed within local memory to identify memory pointer 1005, pointing to a memory location 1005 in shared memory. Again, at step 5007 the frame data from shared memory, at location 1005, is read, resulting in frame data B1 being supplied to the rendering engine at step 508. Again, the question asked at step 509 as to whether another frame is present, resulting in control being returned to step 506 when answered in the affirmative. Thus, this process repeats until all pointer stored in the frame sequence have been read, resulting in their associated frame data being supplied to the rendering engine. The question asked at step 509 will then be answered in the affirmative resulting in a question being asked at step 510 as to whether another composite is required. When answered in the affirmative, control is returned to step 501 and the process is repeated. Alternatively, if answered in the negative, control is returned to the systems passive state, awaiting further commands from the video artist.

Thus, it can be seen that the procedure identified above allows video effects requiring standard processing capacity to be viewed at video rate, thereby enhancing the overall creative process.

I claim:

1. A method of processing input image clips to produce an output image clip representing a dissolve between said input clips, wherein said clips take the form of contiguous images each represented by digitized pixel values, comprising steps of
    reading a first image clip and reading a second image clip from storage devices;
    supplying an input image from said first clip to an accumulating buffer via a scaling process;
    supplying an input image from said second clip to said accumulating buffer via a scaling process; and
    reading said accumulated values from said buffer to produce an image of an output dissolve.

2. A method according to claim 1, wherein said frames represent non-compressed broadcast-quality images defined by a plurality of color components.

3. A method according to claim 1, wherein said video clips are received from arrays of parallel disk drives.

4. A method according to claim 1, wherein said frames are supplied alternately by writing to memory in a sequential order and then reading from memory in an alternating order.

5. A method according to claim 4, wherein said memory transfers are performed by direct memory access.

6. A method according to claim 1, wherein said buffer is cleared after an output image has been read.

7. A method according to claim 1, wherein said scaling process multiplies pixel values of said first image by a scaling value Alpha and said scaling process multiplies pixel values of said second image by a scaling value of one minus Alpha.

8. A method according to claim 7, wherein values for Alpha are varied on a frame-by-frame basis to effect the dissolve.

9. A method according to claim 8, wherein said rendering device forms part of a general purpose instruction driven platform.

10. A method according to claim 1, wherein an output is supplied to a preview monitor.

11. Image data processing apparatus, configured to produce output image signals representing a dissolve between input image clips, wherein said clips take the form of contiguous images each represented by digitized pixel values, comprising
    storage means for image clips;
    reading means configured to read a first image clip and to read a second image clip from said storage means;
    an accumulating image buffer;
    scaling means configured to scale pixel values;
    supplying means configured to supply an input image from said first clip to said buffer and to supply an input image from said second clip to said buffer via said scaling means; and
    reading means configured to read said accumulated values from said buffer to produce an image of an output dissolve.

12. Apparatus according to claim 11, wherein said frames represent non-compressed broadcast-quality images defined by a plurality of colored components.

13. Apparatus according to claim 11, wherein said video clips are received from arrays of parallel disk drives.

14. Apparatus according to claim 11, wherein said frames are supplied alternately by writing to memory in a sequential order and then reading from memory in alternating order.

15. Apparatus according to claim 14, wherein said memory transfers are performed by a direct memory access.

16. Apparatus according to claim 11, including clearing means configured to clear said buffer after an output image has been read.

17. Apparatus according to claim 11, wherein said scaling means is configured to scale pixel values by multiplying said values by a value Alpha or by a value one minus Alpha.

18. Apparatus according to claim 17, including processing means configured to vary values for Alpha on a frame-by-frame basis to effect the dissolve.

19. Apparatus according to claim 18, wherein in said rendering device is a part of a general purpose instructions driven platform.

20. Apparatus according to claim 11, wherein an output is supplied to a preview monitor.

* * * * *